United States Patent [19]
Barrieau et al.

[11] Patent Number: 5,966,002
[45] Date of Patent: Oct. 12, 1999

[54] METHOD AND APPARATUS FOR ADAPTING VOLTAGE CONTROL IN ALARM SYSTEMS

[75] Inventors: Mark P. Barrieau, Baldwinville; Mike A. Faulkner, Shrewsbury; Paul H. Maier, Jr., Athol, all of Mass.

[73] Assignee: Simplex Time Recorder Co., Gardner, Mass.

[21] Appl. No.: 09/078,996

[22] Filed: May 14, 1998

[51] Int. Cl.[6] .................................................... G05F 1/613
[52] U.S. Cl. .......................................................... 323/222
[58] Field of Search ................................... 368/109, 250; 361/434; 364/185, 187; 323/222, 283

[56] References Cited

U.S. PATENT DOCUMENTS 4,530,607  7/1985  Bungener .................................. 368/109

*Primary Examiner*—Shawn Riley
*Attorney, Agent, or Firm*—Hamilton, Brook, Smith & Reynolds, P.C.

[57] ABSTRACT

An output voltage supplied to alarm devices in an alarm system is adjusted according to either a standby condition or an alarm condition. In the standby condition, a power control circuit adjusts power so that a standby voltage is supplied to the alarm devices which allows the alarm devices to respond to poll messages regarding their alarm status. An alarm condition is triggered when an alarm device responds with an alarm status indicating an alarm condition. During an alarm condition, the power control circuit adjusts power to provide a higher voltage to the alarm devices in order to allow additional alarm device functions to be operated.

22 Claims, 3 Drawing Sheets

METHOD AND APPARATUS FOR ADAPTING VOLTAGE CONTROL IN ALARM SYSTEMS

BACKGROUND OF THE INVENTION

In a typical alarm system within a building, such as a fire or burglar alarm system, many types of sensors, detectors, lights, strobes, sounders and other associated devices may be located throughout the building as part of the system. Groups of these devices are often wired together along a pair of lines serving the communication and power requirements of the devices. A group of such devices on a pair of lines is often referred to as a "line of devices". Typically, many lines of devices can connect back to-a control panel that controls the overall operation of the alarm system.

A typical line of devices, such as a line of smoke detectors, for example, may operate on 36 volts of line power supplied from a power source within or attached to the control panel.

According to certain fire codes, alarm systems, such as those used in commercial establishments, must operate correctly during unintentional losses of AC power. To do so, most commercial alarm systems have battery backup power supplies. These alarm systems may also need to operate only on battery backup power during an emergency, for example, when AC power to the building is intentionally turned off. Typically, codes require alarm systems to be able to operate anywhere from twenty four to ninety hours before battery power is exhausted in a nonalarm condition.

An alarm system described in Takahashi, U.S. Pat. No. 5,151,683, provides intermittent alarm system device operation in order to conserve power when operating on batteries. In Takahashi, the control panel intermittently supplies power to each line of devices in a sequentially repeating order. While power is being applied to a line of devices, each device on that line is individually polled by the control panel for an alarm condition. In response to the poll, each device responds individually with a status message indicating either a normal or an alarm condition at that device. When all devices have been polled and have responded with a normal status, the application of power to the line of devices is terminated. The control panel then repeats the process with the next line of devices or with the same line after a short time interval has passed. In this manner, power is applied to the devices only when needed in order to check for an alarm condition at that device location. Thus, Takahashi conserves power by applying power to devices only when needed.

SUMMARY OF THE INVENTION

Most alarm systems, however, are designed to continuously provide uninterrupted power to the lines of devices while the system is operational. Operation of such systems may be generally categorized into two conditions; a standby condition (also called a normal condition) and an alarm condition. In the standby condition, each device on a line is continuously powered and is intermittently polled by the control panel for an alarm status. When a device detects a poll message addressed to itself, the device returns its current alarm status in a message indicating the current state at that device location. To change from a standby condition to an alarm condition, if for example, a smoke detector detects smoke, the smoke detector returns an alarm status indicating the problem upon receipt of the next poll message. This causes the control panel to enter the alarm condition.

During an alarm condition, the control panel may need to activate other functions on the same or on different devices on that line, such as, for example, sounders, strobe lights, and/or water sprinkler heads. The present invention is based on the observation that the operation of these other functions and/or devices during an alarm condition may require additional power to be supplied on the line. However, during the standby condition, when no alarm is present in the system, devices that are merely being polled for their alarm status may not require as much power to operate and respond to the poll messages. That is, the invention recognizes that power requirements may be greater during alarm conditions than during standby conditions.

As such, the invention allows an alarm system to conserve power by supplying a lower voltage on the line during standby conditions and then boosting the voltage on the line during alarm conditions. Conserving power according to this invention may be especially important when the alarm system is running on battery backup power, for example, during a power outage. In this invention, by boosting line power only when devices enter the alarm condition, extra power is made available for lights, sounders or other operations needed only at that time. By keeping power lower during standby periods, battery life and system operation time using battery power may be greatly extended.

As an example of the operation of the invention, suppose smoke detector devices each contain a sounder and light that are normally off in standby conditions, and which are required to be turned on in an alarm condition for waking and guiding people to safety in smoke filled areas. During the standby condition, the smoke detector devices are powered with a first voltage, such as 30 volts, and are continually polled for their alarm status. If smoke is detected, one or more smoke detectors will respond to their next poll message with an alarm status, causing the control panel to enter into an alarm condition. In the alarm condition, the control panel boosts power to the line of smoke detectors, for example, to 36 volts, and each detector is instructed to turn on its light and sound its sounder. The additional 6 volts allows the lights and sounders, which may require more power, to operate effectively, and is only required during the alarm condition. If the detectors subsequently indicate that the smoke has cleared, the line voltage may again be reduced to 30 volts when the control panel re-enters the standby condition.

In one embodiment of the invention, whether the alarm system is operating on AC power, or on battery backup, the power to the line only needs to be boosted during an alarm condition. In another embodiment, during the presence of AC power supply, the system always operates at the higher voltage of the alarm condition. However, when the system senses that AC power is lost and battery backup power is being used, the system drops line voltages to a minimum acceptable level for device operation while in the standby condition, and only boosts the line voltage when an alarm condition occurs.

More specifically, the invention comprises an alarm system and a method of conserving power in an alarm system having an adjustable power supply. The alarm system includes a plurality of alarm devices and a control panel coupled to the alarm devices. The control panel supplies power to the alarm devices. A power control circuit is included within the control panel and provides a standby voltage to the alarm devices while the alarm system is in a standby condition and provides a boosted alarm voltage while the alarm system is in an alarm condition. The standby voltage is less than the alarm voltage. The lower standby voltage allows the invention to conserve power while in standby conditions.

In this manner, the method and apparatus of the invention conserve power and still operate alarm device functions when needed. Power conservation may take place during either application of both AC and battery power to the alarm system, or only during application of battery power to the alarm system. If the former case, by not trying to conserve power during AC power application, full device functionality may be tested due to continuous presence of the alarm voltage level.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
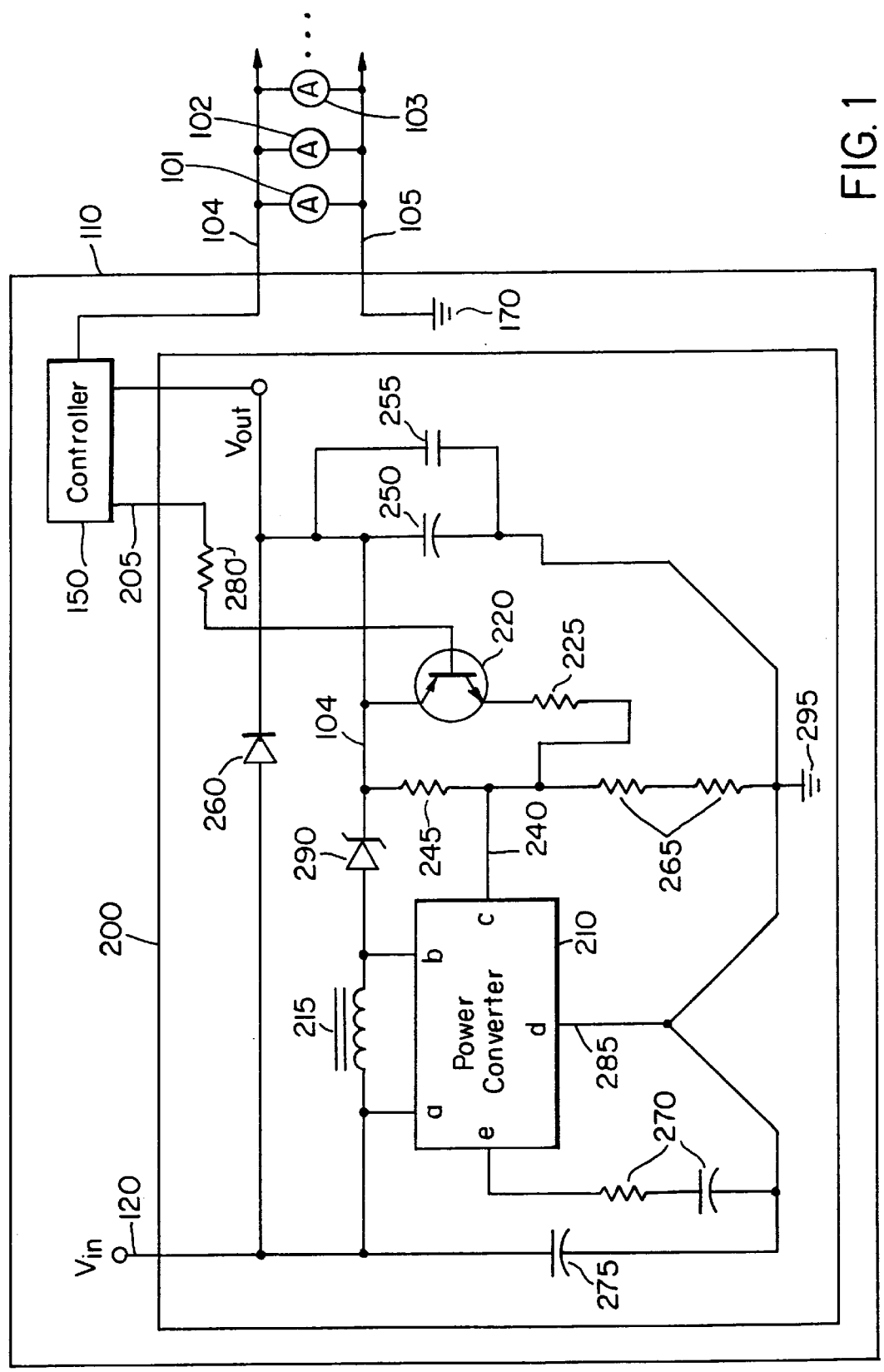
FIG. 1 is an example alarm system circuit configured according to the invention.

FIG. 1 illustrates a circuit configured according to the invention, as applied within the context of a simplified example alarm system 100. Certain components of alarm system 100 are greatly simplified in FIG. 1 for ease of description of the relevant aspects of this invention. In FIG. 1, alarm system 100 may be, for example, a fire alarm system or a security alarm system such as a burglar alarm, access control system, or detention alarm system used within a building.

The main components of the alarm system 100 include alarm devices 101 through 103 and control panel 110 which contains power control circuit 200 and controller 150. Three devices 101 through 103 are shown by way of example only. Each device 101 through 103 is electrically coupled to lines 104 and 105 which connect to the control panel 110. Controller 150 includes a transceiver that provides a communications and power interface through line 104 to devices 101 through 103. Line 105 returns power to ground 170. Lines 104 and 105 may also be used for communication, for example, to send and receive messages between the control panel 110 and the devices 101 through 103. Controller 150 connects to boost input 205 and controls a boost signal provided to the power control circuit 200. The boost signal provided on boost input 205 governs the output voltage output onto line 104 by the power control circuit 200 in either the standby or alarm conditions.

During operation of alarm system 100, while in a standby condition, the controller 150 maintains the boost line 205 in a state that causes the power control circuit 200 to provide a standby voltage on line 104 to devices 101 through 103. For example, the devices 101 through 103 may operate in the standby condition at 30 volts provided by power control circuit 200. The standby voltage provided on line 104 is enough power to allow the devices 101 through 103 to respond to poll messages provided from controller 150 or associated polling circuitry (not shown). However, the standby voltage may not be enough to fully operate all of the features of each device 101 through 103, each of which may also include lights, strobes or sounders, for example. These additional functions and features are typically only required to operate during alarm conditions.

When the controller 150 receives an indication of an alarm condition from one of the devices 101 through 103 in response to a poll, boost input 205 is placed in a boost state which causes the power control circuit 200 to boost the line voltage supplied on line 104 to a higher alarm voltage level. Line voltage may be boosted, for example, from the 30 volt standby voltage to 36 volts of alarm voltage. The increase in voltage allows the additional device functionality, such as the lights, strobes or sounders, which may require more power than is provided by the 30 volt level, to effectively operate during the alarm condition, and ensures that the end-of-line voltage is maintained as alarm loads increase.

Since the voltage used during standby conditions is less than the voltage used during alarm conditions, the overall power consumed by the alarm system is decreased with this invention. Thus, the invention conserves energy while operating on AC power. If AC power is terminated in any manner, the system operates under battery power and the reduced voltage used in the standby condition of this invention considerably extends battery life and available system operation time while operating on battery power.

More specifically, according to the embodiment of the invention shown in FIG. 1, the power control circuit 200 receives a reference voltage supply on the voltage input line (Vin) 120. The reference voltage, may, for example, be 24 volts, and is obtained from either the AC power supply (not shown), or the battery backup power supply (not shown), either of which typically supplies the power requirements for all of the circuitry in the alarm system 100, as noted above. To provide either the low standby condition voltage (i.e., 30 volts) or the high alarm condition voltage (i.e., 36 volts) on line 104 to devices 101, 102 and 103, the power control circuit 200 uses a power adjuster circuit which includes inductor 215 and power converter 210 which together control the amount of voltage available at the capacitor 250 as either the alarm or standby voltage.

In order to properly control the voltage available at capacitor 250, the power converter 210 has an input terminal 210-a coupled to monitor the voltage that is input from voltage input line (Vin) 120 into the primary side of inductor 215. Terminal 210-b is connected to the secondary side of inductor 215 and oscillates according to a duty cycle provided by circuitry within power converter 210. As such, when terminal 210-b is switched on during the first phase of the duty cycle, the inductor is charged-up. When terminal 210-b is off in the second phase of the duty cycle, the inductor 215 releases the stored energy in inductor 215 through diode 290 and into capacitor 250. By adjusting the duty cycle applied to terminal 210-b, the average output voltage provided by capacitor 250 may be controlled.

The timing of the duty cycle provided by power converter 210 is adjusted to maintain a constant reference feedback voltage on feedback terminal 210-c. In operation, the power converter 210 samples the feedback voltage at terminal 210-c and adjusts the timing of the duty cycle of terminal 210-b to provide the selected voltage at capacitor 250. The power converter 210 thus provides a predictable relationship between the output voltage present on line 104, which is maintained at a controlled average by the duty cycle at terminal 210-b, based upon the feedback voltage present at terminal 210-c.

The feedback voltage present at terminal 210-c of the power converter 210 is determined by the combination of feedback resistors 245 and 265, and whether or not the switchable boost resistor 225 is coupled with these feedback resistors. Feedback resistors 245 and 265 are permanently coupled between line 104 and ground 295 and provide a continuous feedback voltage for feedback line 240, which couples between the feedback terminal 210-c and the output of the first feedback resistor 245. The feedback voltage on line 240 and at terminal 210-c can be momentarily adjusted by switching in or out the boost resistor 225 in parallel with feedback resistor 245, via boost switching device 220. When the power converter 210 senses a change in the feedback voltage at terminal 210-c, the duty cycle of terminal 210-b is adjusted so that the feedback voltage on line 240 is brought back in line with a reference value measured within power converter 210. In essence, the power converter 210 seeks to maintain a constant feedback voltage and adjusts the duty cycle of terminal 210-b to do so.

Accordingly, during standby conditions, boost switching device 220, which may be, for example, a transistor or other electrical switching device, is turned on or maintained in an active state by the controller 150 via boost input 205 and buffer resistor 280. Turning on boost switching mechanism 220 places boost resistor 225 in parallel with feedback resistor 245 which lowers the equivalent resistance created by feedback resistor 245 and boost resistor 225. This momentarily offsets the feedback voltage on feedback terminal 210-c. In response, the power converter 210 adjusts the duty cycle of terminal 210-b so that the output voltage of capacitor 250 produces a feedback voltage at terminal 210-c that is equivalent to a reference value which power converter 210 seeks to maintain.

Thus, by activating boost resistor 225 in standby mode, the duty cycle is adjusted so that the inductor 215 charges the capacitor 250 to provide a lower output voltage on line 104, since the output voltage on line 104 governs the required reference feedback voltage at terminal 210-c. The lower standby voltage provided by capacitor 250 may be maintained at 30 volts, for example. The 30 volts provided on line 104 to devices 101 through 103 is enough voltage for each device to respond effectively to poll messages produced by poll message circuitry (not shown). In the event that one or more of devices 101 through 103 detects an alarm and returns an alarm status indicating an alarm condition in response to a poll, the controller 150 enters an alarm condition or state.

During an alarm condition, controller 150 disables or turns off boost switching mechanism 220 via boost input 205. This removes boost resistor 225 from its parallel connection with feedback resistor 245. This momentarily offsets the feedback voltage on terminal 210-c and requires the power converter 210 to adjust the duty cycle of terminal 210-b to allow the inductor 215 to store more energy and thus to charge capacitor 250 to a higher voltage. The higher voltage output by capacitor 250 brings the feedback voltage on line 240 back up to the value sought to be maintained by power converter 210. The output voltage level on line 104 provided by capacitor 250, may be, for example, raised to the alarm voltage level of 36 volts.

In this particular embodiment, capacitor 255 is also provided to minimize any ripple noise on line 104 which may be produced from the duty cycle applied to terminal 210-b. Other features of the circuit include failsafe diode 260 that ensures that line 104 will at least be provided with the reference voltage from input line 120, should any of the other circuitry fail to operate correctly. Finally, the RC-circuit 270 is used for stabilization of the power converter 210, and capacitor 275 provides additional stored energy that may be needed when transitioning from the standby voltage to the alarm voltage and vice versa.

In accordance with the invention, the circuit in FIG. 1 is able to reduce the output voltage used by devices in the alarm system during standby conditions, and then, upon direction from the controller 150, is able to increase the output voltage to accommodate the alarm condition device requirements. The increased voltage allows the devices 101 through 103 to effectively operate additional functions such as sounders, strobes, or lights.

According to one aspect of the invention, the controller 150 can lower the voltage present on line 104 during all standby conditions. This saves power during operation of the alarm system 100 whether the system is operating on battery backup power or on AC power.

According to another alternative aspect of the invention, the controller 150 can receive an indication of when battery power is or is not being used to power the alarm system 100. The controller 150, in this alternative configuration, can then only activate the lower standby voltage when the alarm system in operating on battery power alone. When AC power is being used to power the alarm system 100, the controller 150, according to this alternative aspect, allows boost terminal 205 to float, thus the voltage on line 104 remains at 36 volts if AC power is present even in standby conditions. That is, the controller 150 only activates boost terminal 205 to initiate the lower standby voltage when the alarm system 100 is operating on battery power alone and no alarms are present.

Hence, this aspect of the invention does not conserve power during periods when AC power is supplied to the alarm system 100. Accordingly, since the line 104 is held at 36 volts during standby conditions, device characteristics such as lights and buzzers can be tested for example, while the alarm system 100 is in a standby condition. However, by providing reduced power consumption only when operating on battery power, this aspect of the invention still allows longer system operation times and increased battery life during periods of AC power loss.

Figure 2:
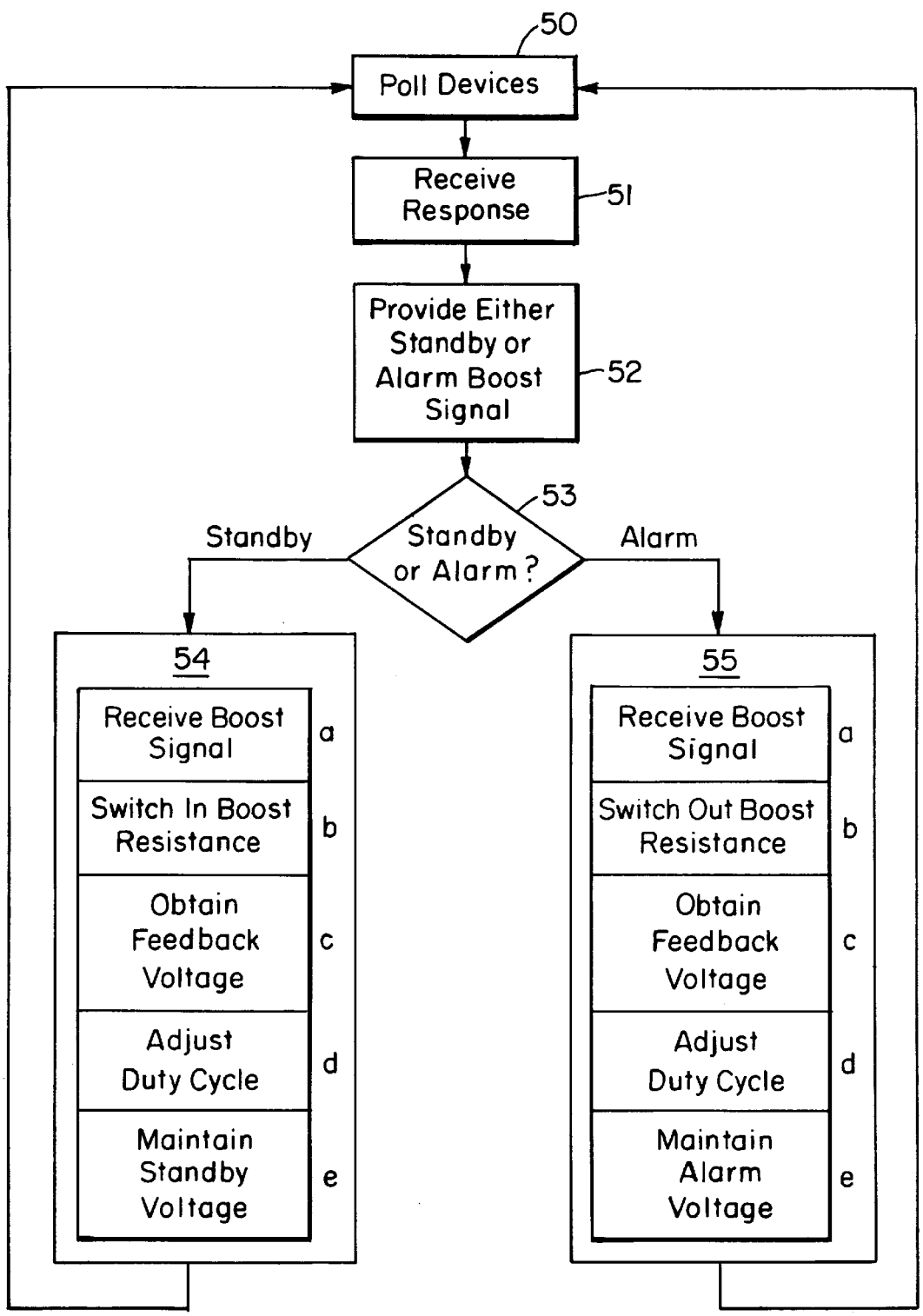
FIG. 2 shows the processing steps for the method of one embodiment of the invention.

FIG. 2 illustrates a method for conserving power in an alarm system according to this invention. Generally, the method illustrated in FIG. 2 uses the apparatus described above with respect to FIG. 1, however, the invention is not limited to performing the method using that apparatus.

In FIG. 2, to conserve power according to this method, step 50 polls the alarm devices for an alarm status. Step 51 waits and receives the alarm status response from each device in the form of a poll response message. Step 52 then provides either a standby or an alarm boost signal based upon the alarm status returned by each device. If any devices return an alarm status indicating an alarm condition, then an alarm signal is provided in step 52. However, if no devices return an alarm condition, then step 52 provides a standby signal. Steps 50, 51 and 52, may be, for example, performed by the controller 150 and/or other associated circuitry in the control panel 110 of the alarm system 100 in FIG. 1.

Step 53 directs the processing depending upon if a standby or an alarm condition is provided in step 52. That is, if step 52 provides a standby condition, then the power control circuitry of the invention, or other circuitry implementing this method, proceeds to processing step 54 and its associated sub-steps 54 a–e. However, if an alarm condition is provided in step 52, then processing proceeds to step 55 and its associated sub-steps 55 a–e.

The standby and alarm signals provided in step 52 may generally be provided from the controller 150 to the power control circuit 200. Thus, in step 54a, the boost signal from step 52 is received by the power control circuit. Step 54b switches in the boost resistance, for example, by placing boost resistor 225 in parallel with feedback resistor 245 in FIG. 1. As explained above, this momentarily offsets the feedback voltage on line 240, at which point step 54c in FIG. 2 obtains the feedback voltage. Based upon the offset feedback voltage obtained in step 54c, steps 54d and 54e adjust the duty cycle to maintain the output voltage at the standby voltage level, of 30 volts, for example. Once the standby voltage level is set, processing returns to step 50 to again poll devices and repeat the process.

If step 51 in FIG. 2 detects an alarm response indicating an alarm condition at one of the polled devices, step 53 provides an alarm signal, for instance, on boost input 205 in FIG. 1. Step 53 then proceeds to step 55, where step 55a receives the boost signal indicating an alarm signal or condition, which, according to the circuit in FIG. 1, allows the boost input 205 to merely float. This causes the boost resistance (i.e., boost resistor 225 in FIG. 1) to be switched out in step 55b which momentarily lowers the feedback voltage on line 240 in FIG. 1. Step 55c then obtains the feedback voltage and uses this value, in steps 55d and 55e, to adjust the duty cycle to maintain the output voltage at the alarm voltage level of, for example, 36 volts. Processing then returns to step 50 to continue polling devices to determine if the alarm condition still exists.

In this manner, a standby voltage is provided by detecting the standby condition, and using a standby boost signal to switch the boost resistance in combination with the feedback resistance, as explained with respect to FIG. 1. Then, during alarm conditions, the output voltage is raised to the alarm voltage level by removing the boost resistance from the feedback voltage. The use of a standby voltage conserves power while in the standby condition and the increased alarm voltage allows devices to properly function from the application of the additional voltage.

Figure 3:
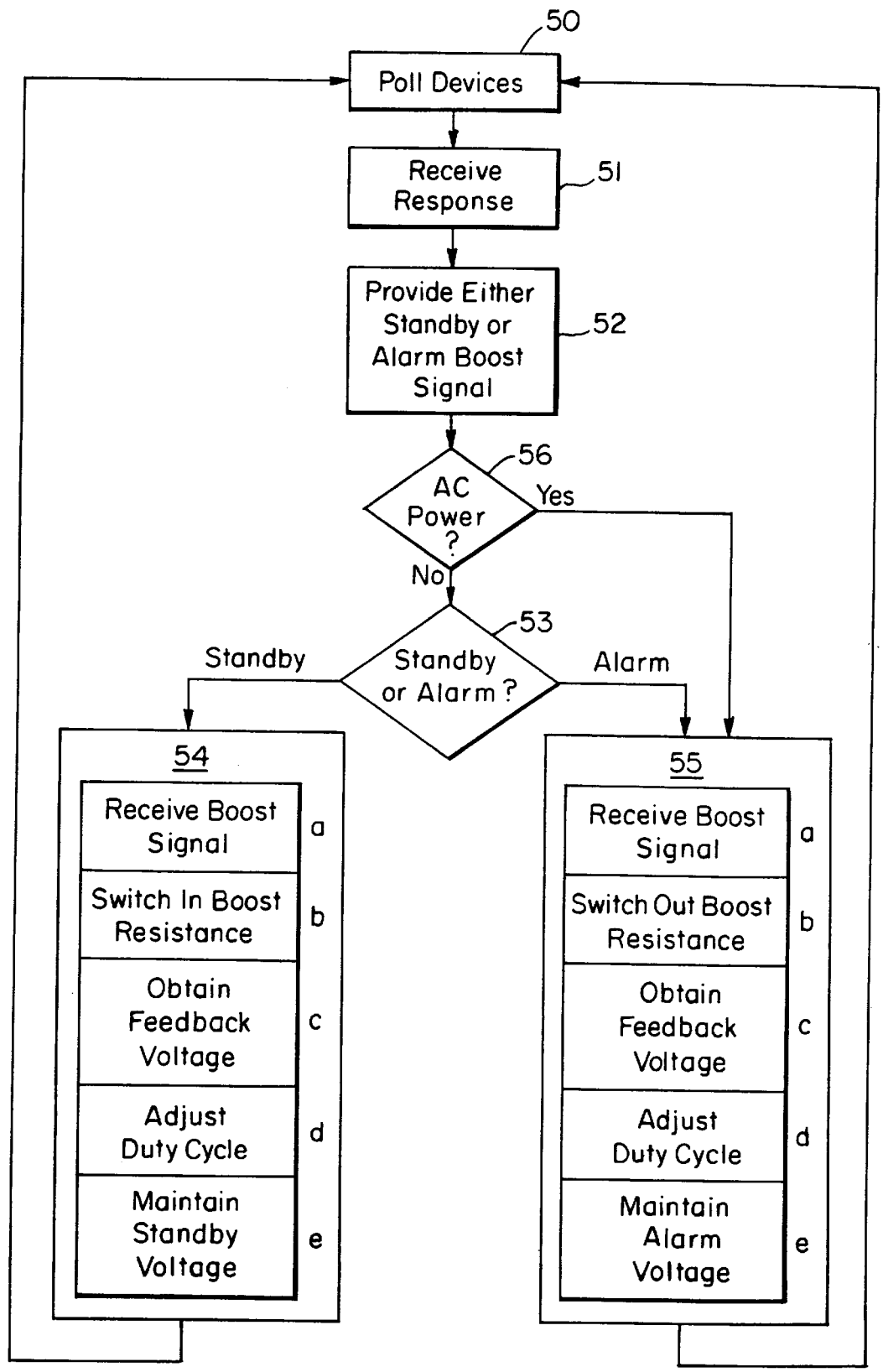
FIG. 3 shows the processing steps for the method of an alternative embodiment of the invention.

FIG. 3 shows an alternative embodiment of the method of the invention which includes an extra step in processing. The general processing of FIG. 3 is similar to that of the processing shown in FIG. 2. However, after step 52 is processed, step 56 determines if the alarm system is currently powered with AC power or battery power. This information is provided, for instance, by controller 150 in FIG. 1. If AC power is used to power the alarm system, then step 56 directs processing to steps 55a through 55e which raise the voltage supplied to the alarm devices to the alarm voltage level, which can be 36 volts for example, irrespective of any present standby or alarm condition determined in step 52.

According to the embodiment in FIG. 3, if AC power is present, the system always provides the alarm voltage level to the devices, since any interest in conserving battery power has little importance when AC power is available. This embodiment thus allows testing of alarm features of alarm system devices while in a standby condition. Since the alarm voltage will always be provided by this embodiment when AC power is present, irrespective of any present standby or alarm condition, any alarm device features such as sounders and lights can correctly operate when tested, or if activated by other alarm activation circuitry that is outside the scope of this invention during a true alarm condition.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An alarm system having an adjustable power supply for conserving energy during operation, the alarm system comprising:

a plurality of alarm devices;

a control panel coupled to the alarm devices, the control panel supplying power to the alarm devices; and a power control circuit within the control panel providing a standby voltage to the alarm devices while the alarm system is in a standby condition and providing a boosted alarm voltage while the alarm system is in an alarm condition, the standby voltage being less than the alarm voltage.

2. The alarm system of claim 1, wherein the power supplied to the alarm devices is from at least one battery and the standby voltage provided to the alarm devices while the alarm system is in a standby condition is lower than the alarm voltage provided to the devices while the alarm system is in an alarm condition in order to conserve power of the at least one battery such that the alarm system may operate for a longer period of time on battery power.

3. The alarm system of claim 1, further comprising:

a controller within the control panel, the controller receiving an indication of an alarm status from the alarm devices; and the controller indicating a standby condition to the power control circuit if the alarm status from the alarm devices does not indicate an alarm condition, and the controller indicating an alarm condition to the power control circuit if the alarm status from at least one alarm device indicates an alarm condition.

4. The alarm system of claim 2, wherein the indication from the alarm devices of an alarm status is sent to the controller in the form of poll response messages from the alarm devices.

5. The alarm system of claim 1, wherein the power control circuit further comprises:

an input receiving a reference voltage;

a power adjuster circuit coupled to the input and having an output for providing an output voltage to the alarm devices in the alarm system, the power adjuster having a feedback input having a first coupling to the output for providing a feedback voltage based on the output voltage, the feedback voltage governing the output voltage provided to the output of the power adjuster;

a boost input coupled to a boost switching mechanism, the boost switching mechanism providing a switchable second coupling between the output and the feedback input;

such that when the boost input is in a first state, the boost switching mechanism is on and activates the second coupling to set the feedback voltage to a first level so that the output voltage provided on the output of the power adjuster circuit is governed to be approximately a standby voltage for use in the standby condition; and when the boost input is in a second state, the boost switching mechanism is off and deactivates the second coupling to set the feedback voltage to a second level so that the output voltage provided on the output of the power adjuster circuit is governed to be approximately an alarm voltage for use in the alarm condition.

6. The alarm system of claim 5, wherein the power adjuster circuit further comprises:
an inductor having an input receiving the reference voltage and an output providing the output voltage to the alarm devices at the standby and alarm voltage levels; and
a power controller having a switchable input coupled to the output of the inductor, the power controller controlling the output voltage on the output of the inductor via adjusting a duty cycle of the switchable input, the duty cycle governed by the feedback voltage present at the feedback input.

7. The alarm system of claim 5, further comprising:
at least one feedback resistance coupled between the output of the power adjuster circuit and a ground reference, the first coupling of the feedback input of the power adjuster circuit formed by a coupling from the feedback input to an output of the at least one feedback resistance which provides the feedback voltage used for alarm conditions; and
a boost resistance coupled between the output of the boost switching mechanism and the output of the at least one feedback resistance to form the second coupling of the feedback input to the output of the power adjuster, such that when the boost switching mechanism is on, the boost resistance is placed in parallel with at least one of the at least one feedback resistance to increase the feedback voltage which lowers the output voltage present on the output of the power adjuster in order to decrease power consumption during the standby condition.

8. The alarm system of claim 5, further comprising a failsafe coupling coupled between the input receiving the reference voltage and the output of the power adjuster circuit, the failsafe coupling providing at least the reference voltage in the event of a failure of the power adjuster circuit.

9. The alarm system of claim 1 wherein the alarm system is a fire alarm system.

10. The alarm system of claim 1 wherein the alarm system is a security alarm system.

11. A power control circuit for conserving power in an alarm system, comprising:
an input receiving a reference voltage;
an output providing an output voltage at a standby voltage level and at an alarm voltage level; and
a boost input receiving a first signal that causes the power control circuit to convert the reference voltage received on the input to a standby voltage for use in a standby condition and when the boost input receives an absence of the first signal, the boost input causes the power control circuit to convert the reference voltage received on the input to an alarm voltage for use in an alarm condition, the alarm voltage being greater than the standby voltage.

12. The power control circuit of claim 11, wherein the reference supply voltage is obtained from a battery power supply and the standby voltage is less than the alarm voltage so as to extend a period of time in which the output voltage provided on the output may be provided and so as to extend a life of the battery power supply.

13. The power control circuit of claim 12, further comprising:
a power adjuster circuit coupled to the input and having an output for providing the output voltage, the power adjuster having a feedback input having a first coupling to the output for providing a feedback voltage based on the output voltage, the feedback voltage governing the output voltage provided to the output of the power adjuster;
a boost switching mechanism coupled to the boost input to receive the first signal, the boost switching mechanism providing a switchable second coupling between the output and the feedback input;
such that when the boost input provides the first signal, the boost switching mechanism is on and activates the second coupling to set the feedback voltage to a first level so that the output voltage provided on the output of the power adjuster circuit is governed to be approximately a standby voltage for use in a standby condition; and
when the boost input does not receive the first signal, the boost switching mechanism is off and deactivates the second coupling to set the feedback voltage to a second level so that the output voltage provided on the output of the power adjuster circuit is governed to be approximately an alarm voltage for use in the alarm condition.

14. The power control circuit of claim 13, wherein the power adjuster circuit further comprises:
an inductor having an input receiving the reference supply voltage and an output providing the operational voltage at the standby and alarm voltage levels; and
a power controller having a switchable input coupled to the output of the inductor, the power controller controlling the output voltage on the output of the inductor via adjusting a duty cycle of the switchable input, the duty cycle governed by the feedback voltage present at the feedback input.

15. The power control circuit of claim 14, further comprising:
at least one feedback resistance coupled between the output of the power adjuster circuit and a ground reference, the first coupling of the feedback input of the power adjuster circuit formed by a coupling from the feedback input to an output of the at least one feedback resistance which provides the feedback voltage used for alarm conditions;
a boost resistance coupled between the output of the boost switching mechanism and the output of the at least one feedback resistance to form the second coupling of the feedback input to the output of the power adjuster, such that when the boost switching mechanism is on, the boost resistance is placed in parallel with the at least one feedback resistance to increase the feedback voltage which lowers the output voltage present on the output of the power adjuster in order to decrease power consumption during the standby condition.

16. A method for controlling power in an alarm system, comprising the steps of:
receiving a boost signal at a power control circuit;
determining if the boost signal indicates a standby condition, and if so, supplying a standby voltage to alarm devices in the alarm system from the power control circuit;
determining if the boost signal indicates an alarm condition, and if so, supplying an alarm voltage to the alarm devices in the alarm system from the power control circuit, the alarm voltage being greater than the standby voltage.

17. The method of claim 16, further comprising the steps of:

polling a plurality of alarm devices for an alarm status;

receiving a response message including an alarm status from each alarm device;

providing a boost signal having a first state to the power control circuit indicating a standby condition if the alarm status from each alarm device does not indicate an alarm condition; and providing a boost signal having a second state to the power control circuit indicating an alarm condition if the alarm status of at least one alarm device indicates an alarm condition.

18. The method of claim 16, wherein the step of supplying a standby voltage further comprises the steps of:

receiving a reference voltage supply;

providing the standby voltage on an output based upon the reference voltage;

the step of supplying a standby voltage further comprising the substeps of:

obtaining a feedback voltage derived from connections through a feedback resistance coupled to the output and through a boost resistance switchably coupled in parallel with the feedback resistance to the output in response to the reception of a boost signal; and adjusting a duty cycle of a connection to the output to regulate the standby voltage based upon the feedback voltage.

19. The method of claim 16, wherein the step of supplying an alarm voltage further comprising the steps of:

receiving a reference voltage supply;

providing the alarm voltage on an output based upon the reference voltage;

the step of supplying an alarm voltage further comprising the sub-steps of:

obtaining a feedback voltage derived from a connection through a feedback resistance coupled to the output; and adjusting a duty cycle of a connection to the output to regulate the alarm voltage based upon the feedback voltage.

20. The method of claim 18, wherein the step of supplying an alarm voltage further comprises the steps of:

receiving the reference voltage supply;

providing the alarm voltage on the output based upon the reference voltage;

the step of supplying an alarm voltage further comprising the sub-steps of:

obtaining the feedback voltage derived from a connection through a feedback resistance coupled to the output; an adjusting the duty cycle of the connection to the output to regulate the alarm voltage based upon the feedback voltage.

21. The method of claim 16, further comprising the step of determining if the alarm system is operating on AC power, and if so, setting the boost signal to indicate an alarm condition in order to supply an alarm voltage to the alarm devices in the alarm system from the power control circuit, irrespective of the standby or alarm condition.

22. The method of claim 21, wherein the step of determining if the alarm system is operating on AC power is performed in order to allow testing of alarm features of the alarm devices while in the standby condition.

* * * * *